US012451954B2

(12) United States Patent
Hirzallah et al.

(10) Patent No.: US 12,451,954 B2
(45) Date of Patent: Oct. 21, 2025

(54) FIFTH GENERATION NEW RADIO RADIO FREQUENCY SENSING WITH POLARIZATION CONFIGURATION

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 18/469,379

(22) Filed: Sep. 18, 2023

(65) Prior Publication Data

US 2025/0096883 A1    Mar. 20, 2025

(51) Int. Cl.
*H04K 1/10* (2006.01)
*H04B 7/10* (2017.01)
*H04L 27/28* (2006.01)
*H04W 72/0453* (2023.01)

(52) U.S. Cl.
CPC .......... *H04B 7/10* (2013.01); *H04W 72/0453* (2013.01)

(58) Field of Classification Search
CPC ..... H04B 7/10; H04B 17/24; H04W 72/0453; H04W 48/16
USPC .......... 375/260, 219, 220, 267, 299, 347
See application file for complete search history.

(56) References Cited

U.S. PATENT DOCUMENTS

2021/0239783 A1    8/2021  Calcev et al.
2024/0056847 A1*   2/2024  Cheema ................. H04B 17/24
2024/0259083 A1*   8/2024  Zhou ..................... H04W 48/16

FOREIGN PATENT DOCUMENTS

CN          115915444 A       4/2023
WO      WO-2022118296 A1      6/2022

OTHER PUBLICATIONS

International Search Report and Written Opinion—PCT/US2024/043970—ISA/EPO—Dec. 9, 2024.

* cited by examiner

*Primary Examiner* — Phuong Phu
(74) *Attorney, Agent, or Firm* — QUALCOMM Incorporated

(57) ABSTRACT

This disclosure provides systems, methods, and devices for wireless communication that support fifth generation (5G) new radio (NR) radio frequency (RF) sensing with polarization configuration. In a first aspect, a method of wireless communication includes receiving at a network node participating in 5G NR RF sensing a first polarization indicator and a second polarization indicator from a network entity. The first polarization indicator is associated with transmission of a first reference sensing signal and the second polarization indicator is associated with reception of a second reference sensing signal. The network node performs sensing measurements using the first polarization indicator and the second polarization indicator and transmits a sensing measurement report including the sensing measurements associated with the second reference sensing signal to the network entity. Other aspects and features are also claimed and described.

30 Claims, 9 Drawing Sheets

FIFTH GENERATION NEW RADIO RADIO FREQUENCY SENSING WITH POLARIZATION CONFIGURATION

TECHNICAL FIELD

Aspects of the present disclosure relate generally to wireless communication systems, and more particularly, to fifth generation (5G) new radio (NR) radio frequency (RF) sensing. Some features may enable and provide improved communications, including 5G NR RF sensing with polarization configuration.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station or other network entity.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving a first polarization indicator and a second polarization indicator from a network entity, the first polarization indicator associated with transmission of a first reference sensing signal and the second polarization indicator associated with reception of a second reference sensing signal, performing sensing measurements using the first polarization indicator and the second polarization indicator, and transmitting a sensing measurement report including the sensing measurements associated with the second reference sensing signal to the network entity.

In an additional aspect of the disclosure, a method for wireless communication includes transmitting a first polarization indicator and a second polarization indicator to one or more network nodes, the first polarization indicator associated with transmission of a first reference sensing signal and the second polarization indicator associated with reception of a second reference sensing signal and receiving a sensing measurement report including sensing measurements associated with the second reference sensing signal from the one or more network nodes.

In an additional aspect of the disclosure, an apparatus includes at least one processor and a memory coupled to the at least one processor. The at least one processor is configured to receive a first polarization indicator and a second polarization indicator from a network entity, the first polarization indicator associated with transmission of a first reference sensing signal and the second polarization indicator associated with reception of a second reference sensing signal, to perform sensing measurements using the first polarization indicator and the second polarization indicator, and to transmit a sensing measurement report including the sensing measurements associated with the second reference sensing signal to the network entity.

In an additional aspect of the disclosure, an apparatus includes at least one processor and a memory coupled to the at least one processor. The at least one processor is configured to transmit a first polarization indicator and a second polarization indicator to one or more network nodes, the first polarization indicator associated with transmission of a first reference sensing signal and the second polarization indicator associated with reception of a second reference sensing signal and to receive a sensing measurement report including sensing measurements associated with the second reference sensing signal from the one or more network nodes.

In an additional aspect of the disclosure, an apparatus includes means for receiving a first polarization indicator and a second polarization indicator from a network entity, the first polarization indicator associated with transmission of a first reference sensing signal and the second polarization indicator associated with reception of a second reference sensing signal, means for performing sensing measurements using the first polarization indicator and the second polarization indicator, and means for transmitting a sensing measurement report including the sensing measurements associated with the second reference sensing signal to the network entity.

In an additional aspect of the disclosure, an apparatus includes means for transmitting a first polarization indicator and a second polarization indicator to one or more network nodes, the first polarization indicator associated with transmission of a first reference sensing signal and the second polarization indicator associated with reception of a second reference sensing signal and means for receiving a sensing measurement report including sensing measurements associated with the second reference sensing signal from the one or more network nodes.

In an additional aspect of the disclosure, a non-transitory computer-readable medium stores instructions that, when executed by a processor, cause the processor to perform operations. The operations include receiving a first polarization indicator and a second polarization indicator from a network entity, the first polarization indicator associated with transmission of a first reference sensing signal and the second polarization indicator associated with reception of a second reference sensing signal, performing sensing measurements using the first polarization indicator and the second polarization indicator, and transmitting a sensing measurement report including the sensing measurements associated with the second reference sensing signal to the network entity.

In an additional aspect of the disclosure, a non-transitory computer-readable medium stores instructions that, when executed by a processor, cause the processor to perform operations. The operations include transmitting a first polarization indicator and a second polarization indicator to one or more network nodes, the first polarization indicator associated with transmission of a first reference sensing signal and the second polarization indicator associated with reception of a second reference sensing signal and receiving a sensing measurement report including sensing measurements associated with the second reference sensing signal from the one or more network nodes.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
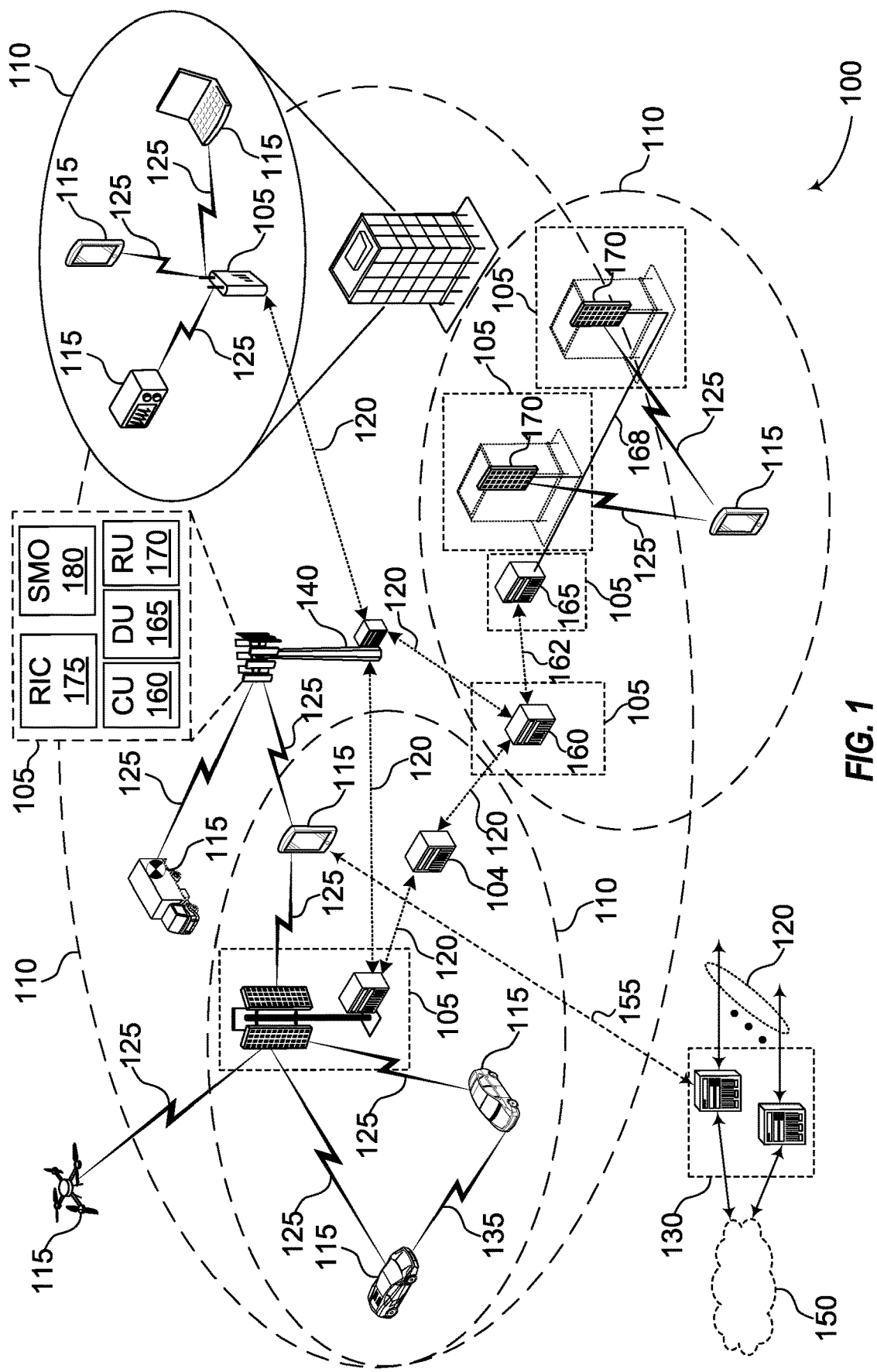
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

5G NR RF sensing allows network nodes to acquire information about characteristics of the environment and/or objects within the environment. It uses radio waves to determine the distance, angle, or instantaneous linear velocity of objects, and the like. 5G NR RF sensing services analyze the transmissions, reflections, and scattering of wireless sensing signals. 5G NR RF sensing services, as part of a cellular network may provide new possibilities for enhanced usage of the telecommunication infrastructure in areas of object detection and tracking, environment monitoring, human motion monitoring, and the like. It may further provide input to various verticals, such as unmanned aerial vehicles (UAVs), smart home devices, V2X, factories, etc. Use cases may cover a wide range of applications, including object and intruder detection for a smart home, on a highway, for railways, factory floor, for predefined secure areas around critical infrastructure; collision avoidance and trajectory tracking of UAVs, vehicles, automated guided vehicles (AGVs); automotive maneuvering and navigation; public safety search and rescue; rainfall monitoring and flooding; health and sports monitoring; and the like.

The present disclosure provides systems, apparatus, methods, and computer-readable media that support 5G NR RF sensing with polarization configuration. According to the various aspects described herein, a network entity (e.g., base station, location management function (LMF) server, sensing management function (SnMF) server, etc.) may send configurations for the sensing or network node, in which the configurations list recommended transmit and receive polarizations for the network node to select, based on sensing node polarization capabilities, for detecting and/or obtaining sensing measurements of a target. Particular implementations of the subject matter described in this disclosure may be implemented to realize one or more of the following potential advantages or benefits. The selection of antenna polarization at the transmit and receive points can positively impact the performance of sensing because the reflections off of the target and clutter sources can be a function of sensing signal polarization. Choosing a proper polarization at the transmit and receive sensing points can realize benefits or advantages, such as target detection enhancement and clutter rejection. For example, when a target is known to have strong reflection/reflectivity to a certain polarization, then transmitting positioning reference signals at the target with this transmission polarization can ensure strong reflectivity off the target and a high signal level reflection at the receiver side. In another example, the choice of polarization usage at transmission and reception points can help distinguishing between targets and other non-target objects (e.g., clutter), especially when the target and non-target objects behave differently when it comes to their reflectivity characteristics to a given polarization. The receiver side can also reject unwanted reflections from non-target objects if it knows their reflections would have different polarization than the one of the intended target.

This disclosure further relates generally to providing or participating in authorized shared access between two or more wireless devices in one or more wireless communications systems, also referred to as wireless communications networks. In various implementations, the techniques and apparatus may be used for wireless communication networks such as CDMA networks, TDMA networks, FDMA networks, OFDMA networks, SC-FDMA networks, LTE networks, GSM networks, 5G or 5G NR networks, as well as other communications networks. As described herein, the terms "networks" and "systems" may be used interchangeably.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports RF component preferences in hybrid beamforming operations at mmWave bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, the network entity 105 may be referred to as a network element, a mobility element, a radio access network (RAN) node, or network equipment, among other nomenclature. In some examples, the network entities 105 and the UEs 115 may wirelessly communicate via one or more communication links 125 (e.g., a radio frequency (RF) access link).

The UEs 115 may be dispersed throughout the coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be the network entity 105 (e.g., any network entity described herein), the UE 115 (e.g., any UE described herein), a network controller, an apparatus, a device, a computing system, one or more components, or another suitable processing entity configured to perform any of the techniques described herein. For example, a node may be the UE 115. As another example, a node may be the network entity 105.

In some examples, the network entities 105 may communicate with the core network 130, or with one another, or both. For example, the network entities 105 may communicate with the core network 130 via one or more backhaul communication links 120 (e.g., in accordance with an S1, N2, N3, or other interface protocol). In some examples, the network entities 105 may communicate with one another over the backhaul communication link 120 (e.g., in accordance with an X2, Xn, or other interface protocol) either directly (e.g., directly between the network entities 105) or indirectly (e.g., via the core network 130). In some examples, the network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, the midhaul communication links 162, or the fronthaul communication links 168 may be or include one or more wired links (e.g., an electrical link, an optical fiber link), one or more wireless links (e.g., a radio link, a wireless optical link), among other examples or various combinations thereof. The UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, the network entity 105 (e.g., the base station 140) may be implemented in an aggregated (e.g., monolithic, standalone) base station architecture, which may be configured to utilize a protocol stack that is physically or logically integrated within a single network entity 105 (e.g., a single RAN node, such as the base station 140).

In some examples, the network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, the network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. The RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The UE 115 may include or may be referred to as a mobile device, a wireless device, a remote device, a handheld device, or a subscriber device, or some other suitable terminology, where the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of the UEs 115.

In some examples, the UE 115 may be able to communicate directly with other of the UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of the network entity 105 (e.g., the base station 140, the RU 170), which may support aspects of such D2D communications being configured by or scheduled by the network entity 105. In some examples, one or more UEs 115 in such a group may be outside of the coverage area 110 of the network entity 105 or may be otherwise unable to or not configured to receive transmissions from the network entity 105. In some examples, groups of the UEs 115 communicating via D2D communications may support a one-to-many (1:M) system in which each UE 115 transmits to each of the other ones of the UEs 115 in the group. In some examples, the network entity 105 may facilitate the scheduling of resources for D2D communications. In some other examples, D2D communications may be carried out between the UEs 115 without the involvement of the network entity 105.

In some systems, the D2D communication link 135 may be an example of a communication channel, such as a sidelink communication channel, between vehicles (e.g., the UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., the network entities 105, the base stations 140, the RUs 170) using vehicle-to-network (V2N) communications, or with both.

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between the UE 115 and the network entity 105 or the core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., the communication link 125, the D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
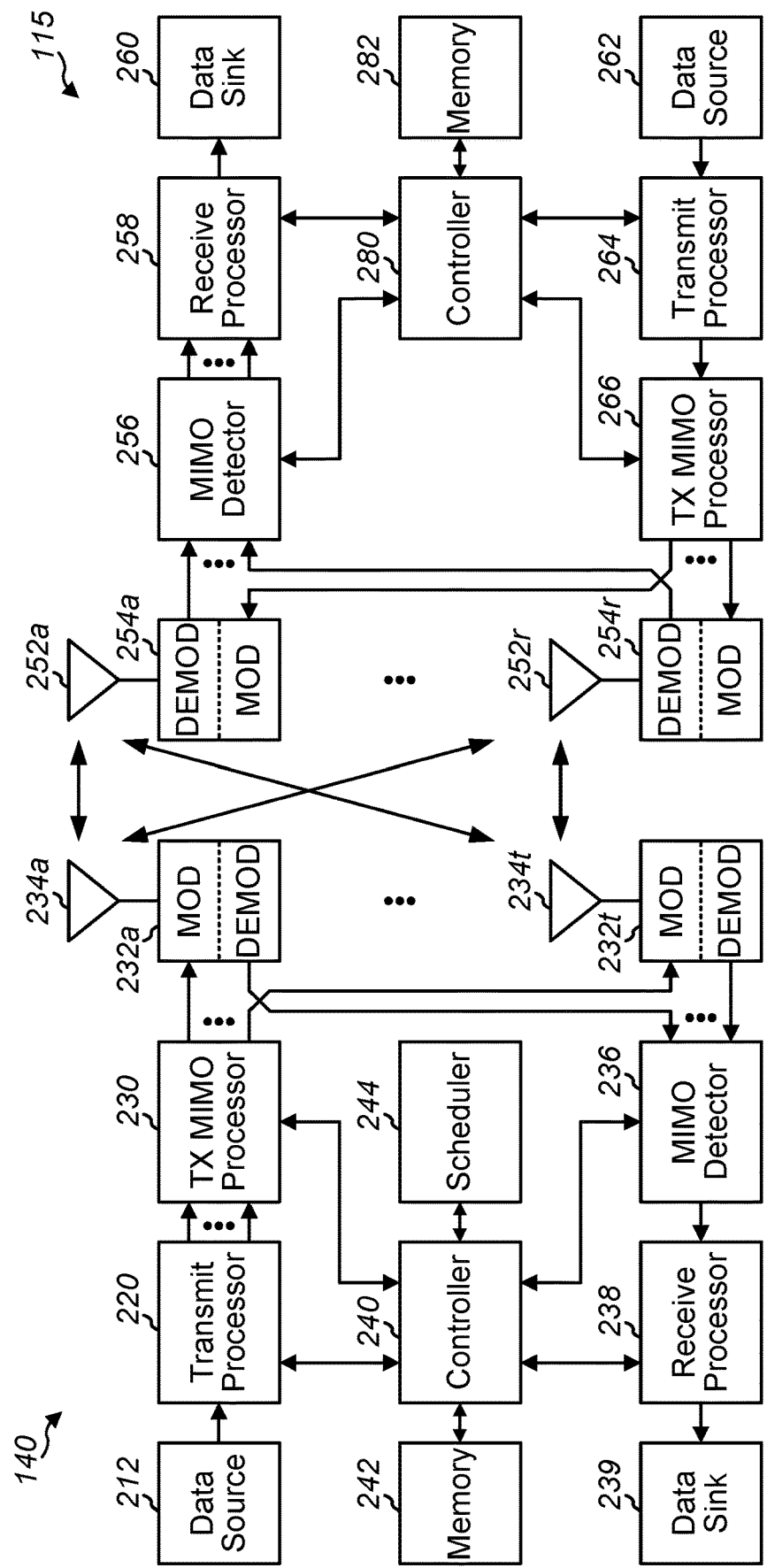
FIG. 2 is a block diagram illustrating examples of a base station and a user equipment (UE) according to one or more aspects.

FIG. 2 is a block diagram illustrating examples of the base station 140 and the UE 115 according to one or more aspects. The base station 140 and the UE 115 may be any of the network entities and base stations and one of the UEs in FIG. 1. For a restricted association scenario (as mentioned above), the network entity 105 may be small cell base station, and the UE 115 may be the UE 115 operating in a service area of the small cell base station, which in order to access the small cell base station, would be included in a list of accessible UEs for the small cell base station. The base station 140 may also be a base station of some other type. As shown in FIG. 2, a network entity 105, such as the base station 140 may be equipped with the antennas 234a through 234t, and the UE 115 may be equipped with the antennas 252a through 252r for facilitating wireless communications.

At the base station 140, the transmit processor 220 may receive data from the data source 212 and control information from the controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, the transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. The transmit (TX) MIMO processor 230 may perform spatial processing (e.g., precoding) on the data symbols, the control symbols, or the reference symbols, if applicable, and may provide output symbol streams to the modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from the modulators 232a through 232t may be transmitted via the antennas 234a through 234t, respectively.

At the UE 115, the antennas 252a through 252r may receive the downlink signals from the base station 140 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. The MIMO detector 256 may obtain received symbols from the demodulators 254a through 254r, perform MIMO detection on the received symbols if applicable, and provide detected symbols. The receive processor 258 may process (e.g., demodulate, deinterleave, and decode) the detected symbols, provide decoded data for the UE 115 to the data sink 260, and provide decoded control information to the controller 280, such as a processor.

On the uplink, at the UE 115, the transmit processor 264 may receive and process data (e.g., for a physical uplink shared channel (PUSCH)) from the data source 262 and control information (e.g., for a physical uplink control channel (PUCCH)) from the controller 280. Additionally, the transmit processor 264 may also generate reference symbols for a reference signal. The symbols from the transmit processor 264 may be precoded by the TX MIMO processor 266 if applicable, further processed by the modulators 254a through 254r (e.g., for SC-FDM, etc.), and transmitted to network entity 105. At the network entity 105, the uplink signals from the UE 115 may be received by the antennas 234, processed by the demodulators 232, detected by the MIMO detector 236 if applicable, and further processed by the receive processor 238 to obtain decoded data and control information sent by the UE 115. The receive processor 238 may provide the decoded data to the data sink 239 and the decoded control information to the controller 240.

The controllers 240 and 280 may direct the operation at the base station 140 and the UE 115, respectively. The controller 240 or other processors and modules at the base station 140 or the controller 280 or other processors and modules at the UE 115 may perform or direct the execution of various processes for the techniques described herein, such as to perform or direct the execution illustrated in FIGS. 4A and 4B, or other processes for the techniques described herein. The memories 242 and 282 may store data and program codes for the base station 140 and the UE 115, respectively. The scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
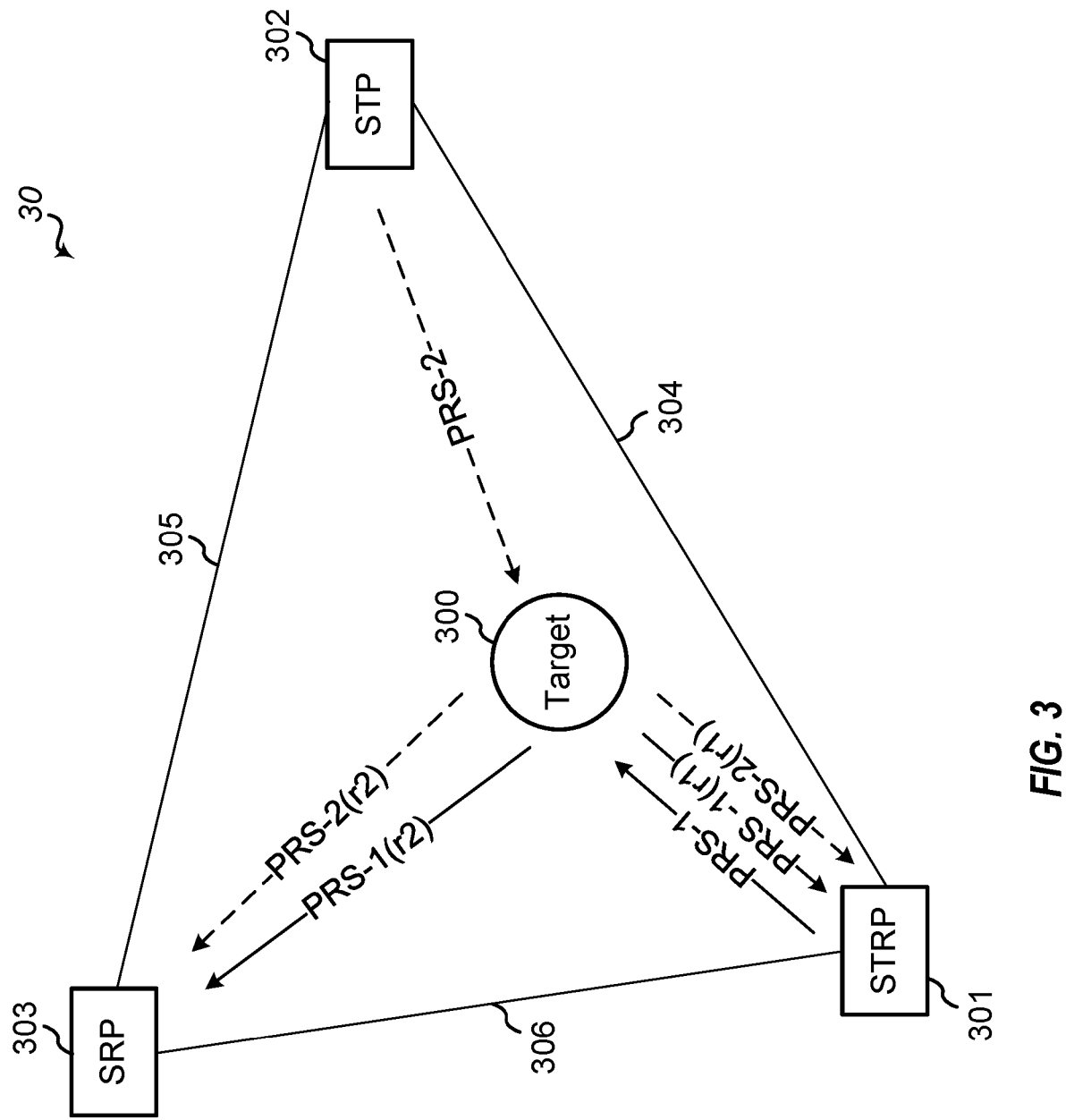
FIG. 3 is a block diagram illustrating an RF sensing network capable of supporting 5G NR RF sensing with polarization configuration according to one or more aspects.

FIG. 3 is a block diagram illustrating RF sensing network 30 capable of supporting 5G NR RF sensing with polarization configuration according to one or more aspects. The illustrated portion of RF sensing network 30 includes sensing transmit-receive point (STRP) 301, sensing transmit point (STP) 302, and sensing receive point (SRP) 303. STRP 301, STP 302, and SRP 303 may include various wireless devices and network nodes (e.g., WiFi access points, WiFi-capable devices, UEs, gNBs, network entries, LMF, SnMF, etc.) in one or more RF radio access networks. STRP 301, STP 302, and SRP 303 may communicate with one another over wired or wireless access links, access links 304-306, respectively. In RF sensing, a wireless signal can be transmitted from one or multiple transmit points (e.g., STRP 301 and STP 302) and received at one or multiple receive points (e.g., STRP 301 and SRP 302) after being reflected off a target 300 to be sensed.

In example operation, STRP 301 transmits positioning reference signal (PRS)-1. PRS-1 impacts target 300 with STRP 301 and SRP 303 detecting reflections signals, PRS-1($r1$) and PRS-1($r2$), respectively. Similarly, STP 302 transmits PRS-2, which impacts target 300 with STRP 301 and SRP 303 detecting reflection signals, PRS-2($r1$) and PRS-2($r2$). STRP 301 would communicate parameters of SRP-1 to SRP 303 via access link 306. Similarly, STP 302 may communicate the parameters of SRP-2 to STRP 301 and SRP 303 via access links 304 and 305, respectively. The positioning of target 300 may then be determined according to the orientational changes between the SRPs (e.g., SRP-1 and SRP-2) and their detected reflections (e.g., SRP-1($r1$), SRP-1($r2$), SRP-2($r1$), and SRP-2($r2$)). Each of STRP 301 and SRP 303 may perform sensing measurements that determine such orientational changes.

RF sensing can enable many candidate applications, including intruder detection, animal/pedestrian/UAV intrusion detection on highways and railways, rainfall monitoring, flooding awareness, autonomous driving, AGV detection/tracking/collision avoidance, smart parking and assistance, UAV trajectory and tracking, crowd management, sleep/health monitoring, gesture recognition, XR streaming, public safety search and rescue, and the like.

One aspect for RF sensing is selection of an appropriate antenna polarization at the transmit and receive points (e.g., STRP 301, STP 302, and SRP 303). Selection of antenna polarization at transmit and receive points can affect the performance of the sensing process because the reflections (e.g., SRP-1($r1$), SRP-1($r2$), SRP-2($r1$), and SRP-2($r2$)) off of a target, such as target 300, and clutter sources (not shown) can be a function of sensing signal polarization.

Polarization can be described by looking at the locus of an electric field, such as the locus of field oscillation, or can also be described for magnetic fields or transverse waves. Representative polarizations can take a linear orientation (e.g., vertical, horizontal, or radial), a circular orientation in either a clockwise (CW) direction or counter-CW (CCW) direction, or an elliptical orientation in either the CW or CCW directions. The interaction between electromagnetic (EM) wave and the environment or target, such as target 300, can change the polarization of the electric field. To accurately receive an EM wave, it is preferred that the receive antenna(s) match the polarization of the received EM wave. A polarization can be realized through antenna port design and implementation. Therefore, a particular polarization or a set of polarizations can map to an associated antenna port or set of antenna ports.

Figure 4A:
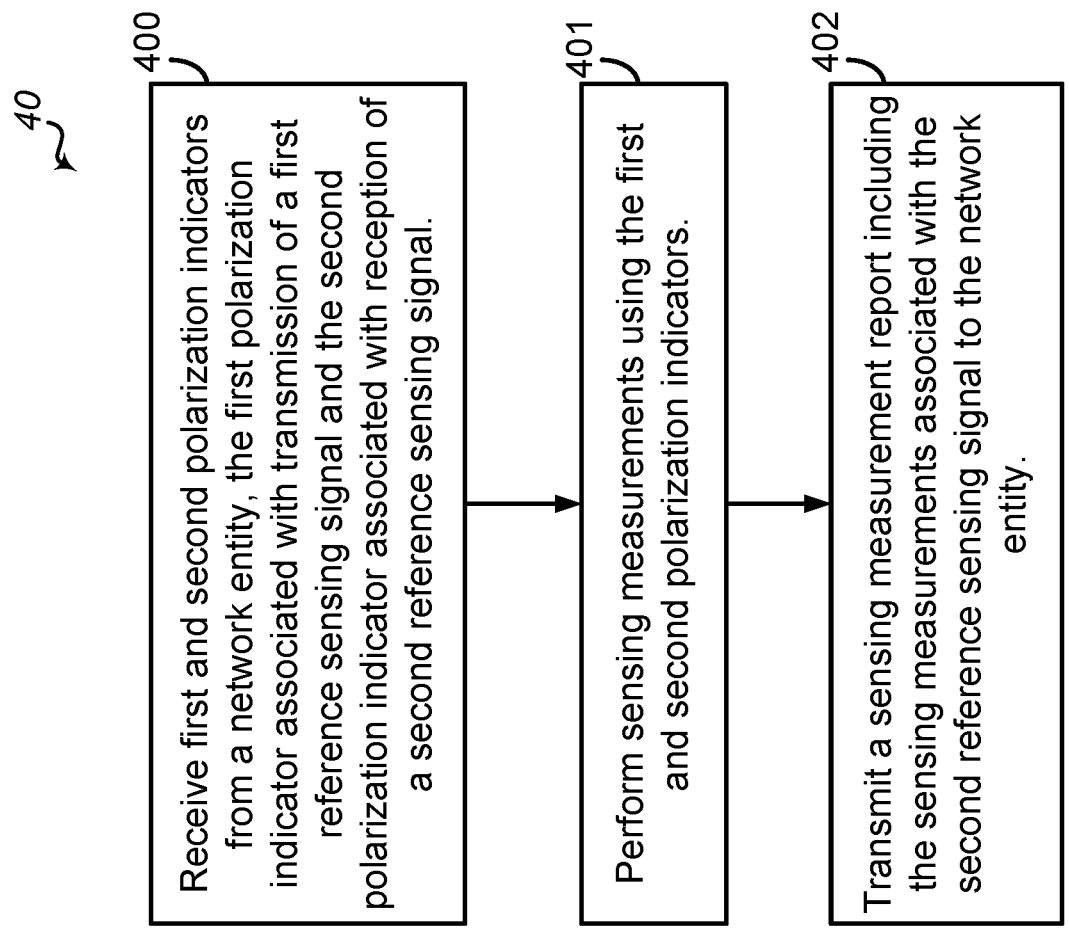
FIGS. 4A and 4B are flow diagrams illustrating an example processes that support 5G NR RF sensing with polarization configuration according to one or more aspects.

FIG. 4A is a flow diagram illustrating an example process 40 that supports 5G NR RF sensing with polarization configuration according to one or more aspects. Operations of process 40 may be performed by a network node, such as UE 115, network entity 105, STRP 301, STP 302, and SRP 303 described above with reference to FIGS. 1, 2, 3, or a network node described with reference to FIG. 5. For example, example operations (also referred to as "blocks")

of process 40 may enable the network node to support 5G NR RF sensing with polarization configuration.

At block 400, a network node receives a first polarization indicator and a second polarization indicator from a network entity, the first polarization indicator associated with transmission of a first reference sensing signal and the second polarization indicator associated with reception of a second reference sensing signal. A network node may receive a polarization configuration message for a network entity managing a 5G NR RF sensing service. The polarization configuration message would include a set of recommended transmit and receive polarizations to use for transmitting and receiving positioning or sensing reference signals.

At block 401, the network node performs sensing measurements using the first polarization indicator and the second polarization indicator. When the network node is configured to transmit positioning or sensing reference signals, it may identify an antenna port associated with a selected transmit polarization from the polarization configuration. The network node may then transmit the reference signal using the selected polarization. When the network node is configured to receive reflections of positioning or sensing reference signals, whether the network node transmitted the signal or is receiving reflections of the positioning or sensing reference signals transmitted by another participating network node, it identifies an antenna port associated with a selected receive polarization from the polarization configuration to receive such reflected signals. The network node performs sensing measurements on the received reflected positioning or sensing signals including identifying the polarization of the received reflected signal. Sensing measurements may include measuring multiple characteristics of the received reflected signal, such as signal strength, as the time of arrival, reference signal time difference, observed time different of arrival, and the like.

At block 402, the network node transmits a sensing measurement report including the sensing measurements associated with the second reference sensing signal to the network entity. Once the sensing measurements are conducted and the polarization of the measured reflected signal is determined, the network node may transmit a sensing measurement report that includes the sensing measurement information and the polarization of the measured signal.

Figure 4B:
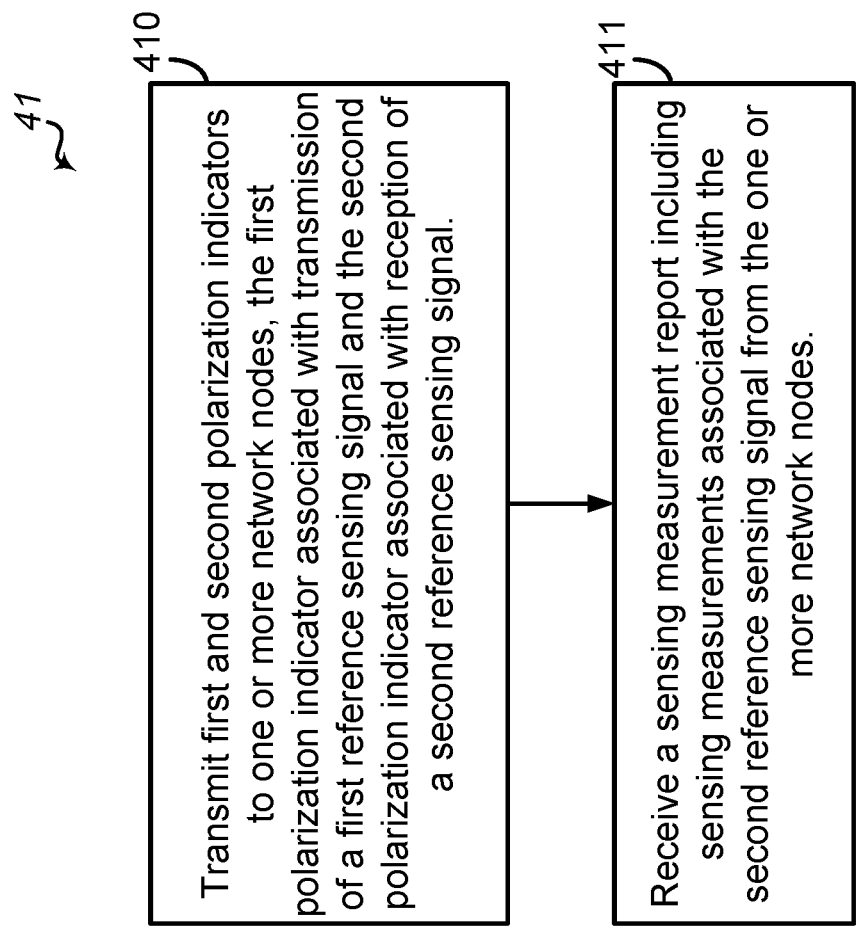

FIG. 4B is a flow diagram illustrating an example process 41 that supports 5G NR RF sensing with polarization configuration according to one or more aspects. Operations of process 41 may be performed by a network entity, such as network entity 105 described above with reference to FIGS. 1 and 2, or a network entity 800 described with reference to FIG. 8. For example, example operations (also referred to as "blocks") of process 41 may enable network entity 800 to support 5G NR RF sensing with polarization configuration.

At block 410, a network entity transmits a first polarization indicator and a second polarization indicator to one or more network nodes, the first polarization indicator associated with transmission of a first reference sensing signal and the second polarization indicator associated with reception of a second reference sensing signal. A network entity that manages 5G NR RF sensing services may initiate a sensing service for certain targets by transmitting a polarization configuration message to one or more participating sensing network nodes. The network nodes may transmit positioning or sensing reference signals and/or receive and measure reflected reference signals to implement the 5G NR RF sensing service. The polarization configuration message includes a set of recommended transmit and receive polarizations for use with implementing the 5G NR RF sensing service.

At block 411, the network entity receives a sensing measurement report including sensing measurements associated with the second reference sensing signal from the one or more network nodes. The participating sensing network nodes provide sensing measurement reports to the network entity for determining the positioning or sensing of the target and rejecting any clutter signals that do not represent the positioning or sensing of the target.

As described with reference to FIGS. 4A and 4B, the present disclosure provides techniques for 5G NR RF sensing with polarization configuration. The selection by a network node of antenna polarization from a network entity at the transmit and receive points can positively impact the performance of sensing because the reflections off of the target and clutter sources can be a function of sensing signal polarization. Choosing an appropriate polarization at the transmit and receive sensing points can realize benefits or advantages, such as target detection enhancement and clutter rejection. For example, when a target is known to have strong reflection/reflectivity to a certain polarization, then transmitting positioning reference signals at the target with this transmission polarization can ensure strong reflectivity off the target and a high signal level reflection at the receiver side. In another example, the choice of polarization usage at transmission and reception points can help distinguishing between targets and other non-target objects (e.g., clutter), especially when the target and non-target objects behave differently when it comes to their reflectivity characteristics to a given polarization. The receiver side can also reject unwanted reflections from non-target objects if it knows their reflections would have different polarization than the one of the intended target.

Figure 5:
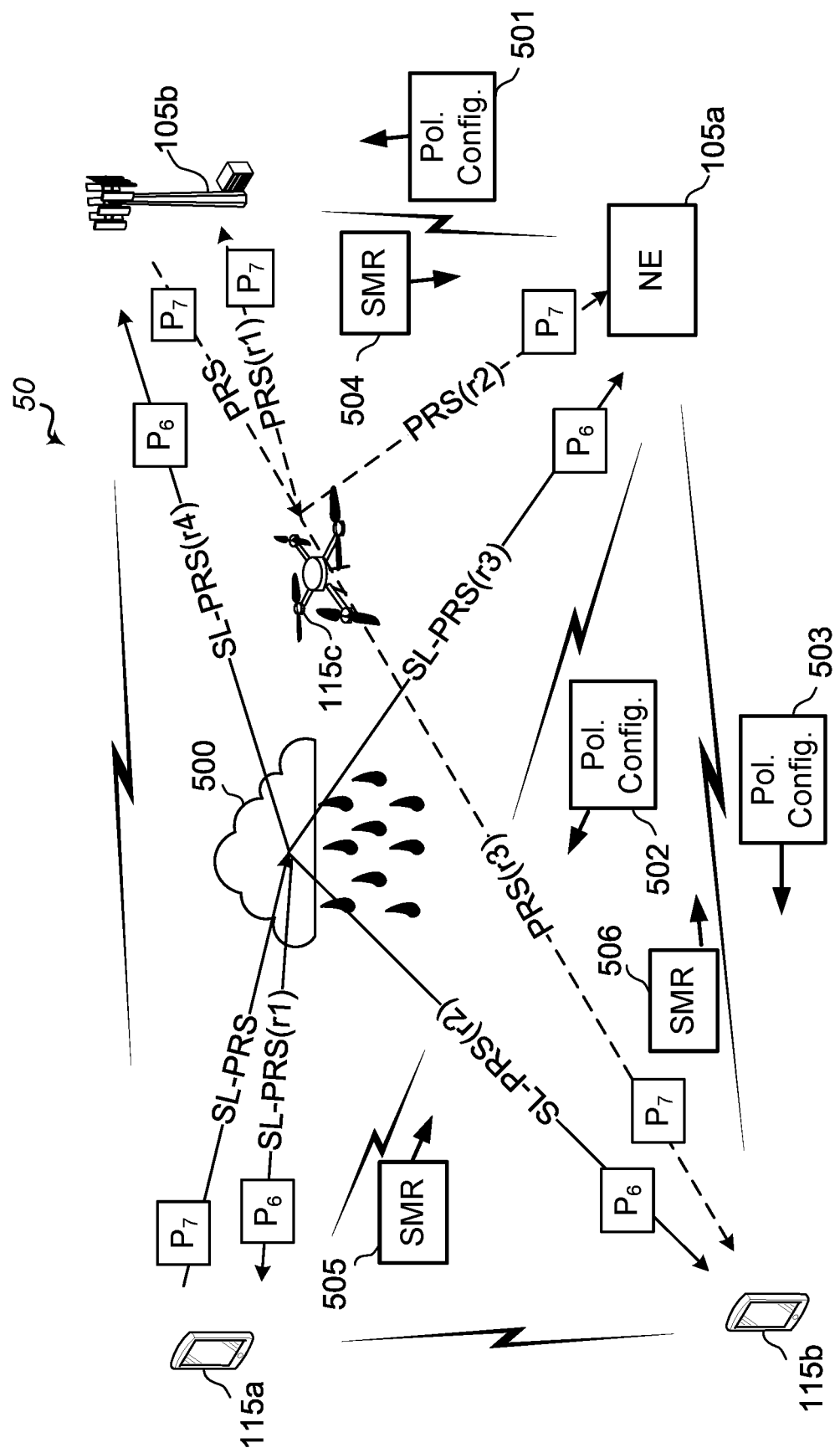
FIG. 5 is a block diagram illustrating a 5G NR network including network elements, each configured to support 5G NR RF sensing with polarization configuration according to one or more aspects.

FIG. 5 is a block diagram illustrating a 5G NR network 50 including network elements 105a and 105b and UEs 115a and 115b, each configured to support 5G NR RF sensing with polarization configuration according to one or more aspects. Network element 105a may be implemented as a network element as illustrated in FIGS. 1 and 2, such as network element 105 or base station 140. It may also be implemented as a network element configured as a specialized server handling positioning or sensing functionality, such as an LMF or SnMF. Network element 105a initiates a 5G NR RF sensing service by communicating with other network nodes (e.g., UEs 115a and 115b and network element 105b) to use positioning reference signals (PRS) to sense a target. The target may be multiple different objects or conditions desired for sensing. For example, as illustrated in FIG. 5, the target may comprise a specific object, such as UAV 115c, or may comprise a particular condition, such as rain event 500.

As a part of the communication with the network nodes (e.g., UEs 115a and 115b and network element 105b), network element 105a transmits a polarization configuration (e.g., polarization configurations 501-503) that includes recommended transmit and receive polarizations for the sensing service. The receive polarization may be associated with the particular target intended for sensing. For purposes of the illustrated example, reflections off of rain, such as rain event 500, can be polarized in a different orientation to the transmitted PRS (e.g., CW circular polarization for PRS vs. CCW circular polarization for the reflection, etc.). In contrast, reflections off of an object, such as UAV 115c, can be polarized in the same orientation to the transmitted PRS (e.g., CW elliptical polarization for PRS vs. CCW elliptical polarization for the reflection, etc.). Thus, in the illustrated example, if the target to be sensed is rain event 500, network element 105a may include in polarization configurations 501-503 a recommended transmit polarization of a first orientation and a recommended receive polarization in a second orientation, where the second polarization is in the opposite orientation than the first polarization. Alternatively, if the target to be sensed is UAV 115c, network element 105a may include in polarization configurations 501-503 a recommended transmit polarization of a first orientation and a recommended receive polarization in a second orientation, where the second polarization is in the same orientation as the first polarization.

In a first example of operation, as illustrated in FIG. 5, network element 105a initiates a 5G NR RF sensing service by communicating polarization configurations 501-503 of a list of recommended polarizations to the cooperating network nodes, UEs 115a and 115b and network element 105b. In the first example operation, the target to be sensed is UAV 115c. Accordingly, the list of recommended polarizations includes a transmit polarization, $P_7$, and a receive polarization, $P_7$. The transmitting network nodes for the 5G NR RF sensing service, UE 115a and network element 105b, transmit SL-PRS and PRS, respectively, at the $P_7$ polarization. On the receiving end, the receiving network nodes, UEs 115a and 115b and network elements 105a and 105b, select the antenna port associated with the $P_7$ polarization for receiving the reflections. The receiving network nodes, UEs 115a and 115b and network elements 105a and 105b, perform sensing measurements for the reflections using the antenna port associated with the $P_7$ polarization. Network element 105b receives the reflection PRS(r1) of its transmitted PRS at the $P_7$ polarization. Network element 105a receives the reflection PRS(r2) of the transmitted PRS at the $P_7$ polarization, and UE 115b receives the reflection PRS(r3) of the transmitted PRS at the $P_7$ polarization. Network element 105b and UE 115b may then send sensing measurement reports 504 and 506, respectively, that includes the measurements of the reflected PRS and the polarization of the reflected signal.

UE 115a transmits SL-PRS at the $P_7$ polarization for sensing. However, SL-PRS encounters rain event 500, which causes the reflection signals to be redirected at a different, opposite polarization. UE 115a performs sensing measurements on receiving reflection SL-PRS(r1) but detects the polarization at $P_6$ and not $P_7$. Similarly, UE 115b, network entity 105a, and network entity 105b perform sensing measurements on receipt the reflections, SL-PRS (r2), SL-PRS(r3), and SL-PRS(r4), respectively, at the $P_6$ polarization. The receiving network nodes, UEs 115a and 115b and network entity 105b may then transmit sensing measurement reports 504-506 that includes the measurements of the reflected signals along with the associated polarizations. By selecting the appropriate polarization in the configuration list for detection of UAV 115c, network element 105a may more efficiently determine the reflection signals that are associated with reflection off of UAV 115c and the other reflections signals that are clutter, such as the reflections that occurred off of rain event 500.

Alternatively, if network entity 105a intends the sensing service to be a rain sensor, the configurations list may include a transmit polarization of $P_7$ and a receive polarization of $P_6$. The receiving network nodes, UEs 115a and 115b and network entity 105b, may then select the antenna port associated with the $P_6$ polarization for receiving reflected signals. After performing sensing measurement on the respective reflections, SL-PRS(r1), SL-PRS(r2), SL-PRS (r4), PRS(r1), and PRS(r3), the receiving network nodes, UEs 115a and 115b and network entity 105b, send sensing measurement reports 504-506 to network entity 105a along with the associated polarizations. In this alternative implementation, network entity 105a may distinguish the clutter signals to be the reflection signals PRS(r1) and PRS(r3) from UAV 115c from the accurately sensed rain event 500.

Accordingly, selecting an appropriate polarization at the transmit and receive sensing points can result in advantages to enhanced target detection and enhanced clutter rejection. It should be noted that there are many other applications and scenarios in which polarization setting for transmit and receive points can offer similar advantages, including detecting other weather phenomena, detecting sea level, detecting marine targets, detecting incursions onto highways or train tracks, and the like.

In an alternative aspect, network entity 105a may send polarization configurations 501-503 for the sensing network nodes, UE 115a and 115b and network entity 105b, in which the list the recommended transmit and receive polarizations may be based on the capabilities of the sensing nodes, UE 115a and 115b and network entity 105b, for detecting and/or obtaining sensing measurements for a target. Polarization configurations 502-503 can be sent to the sensing UE network nodes, UE 115a and 115b, as part of LPP or sensing framework signaling. Similarly, the sensing UE network nodes, UE 115a and 115b, may transmit their capabilities as part of LPP or sensing framework signaling. Polarization configuration 501 and any capabilities from network entity 105b can be sent as part of NRPPa or an equivalent sensing framework.

In another alternative aspect, network entity 105a may transmit polarization configurations 501-503 that include multiple sets of candidate polarizations. Network entity 105a may then activate one or more of these polarizations through dynamic signaling, such as medium access control (MAC) control elements (CEs), downlink control information (DCI) signaling, and the like, where multiple polarizations may be active at any one time. With reference to the example implementation described with respect to FIG. 5, polarization configurations 501-503 may include transmit polarization, $P_7$, and receive polarizations, $P_7$ and $P_6$. When network entity 105a determines to initiate a sensing service to sense objects, such as UAV 115c, it transmits a dynamic signaling message to the sensing nodes, UEs 115a and 115b and network entity 105b) that activates $P_7$ as the receive polarization. Conversely, where network entity 105a determines to initiate a sensing service to sense weather events, such as rain event 500, it may transmit dynamic signaling to the sensing nodes, UEs 115a and 115b and network entity 105b) that activates $P_6$ as the receive polarization.

Figure 6:
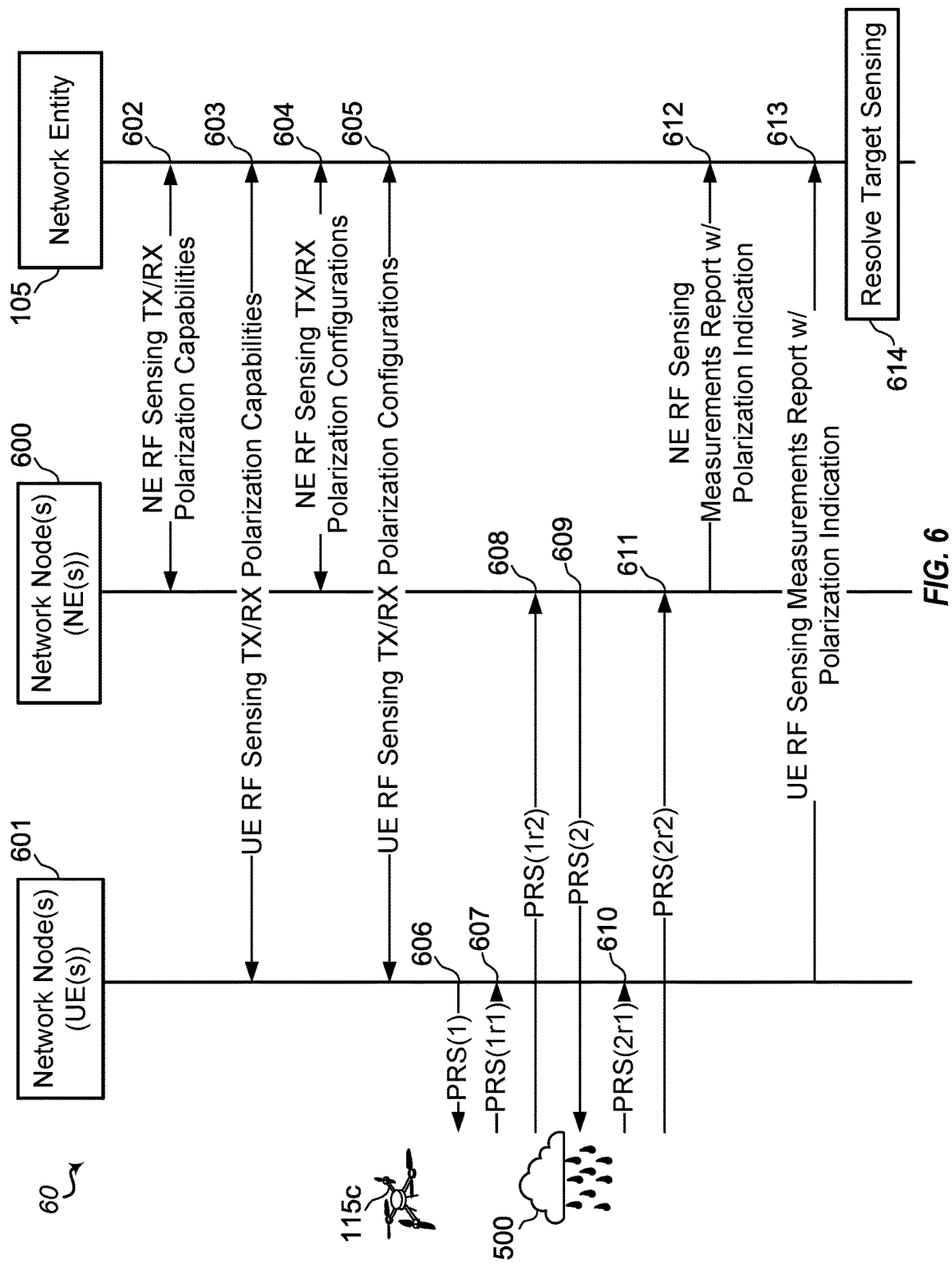
FIG. 6 is a call flow diagram illustrating the communications between a network entity and 5G NR RF sensing network nodes, each configured to support 5G NR RF sensing with polarization configuration according to one or more aspects.

FIG. 6 is a call flow diagram illustrating the communications between network entity 105 and 5G NR RF sensing network nodes 600-601, each configured to support 5G NR RF sensing with polarization configuration according to one or more aspects. Network entity 105 provides 5G NR RF sensing services to sense for targets, whether the targets are objects, such as UAV 115c, or environmental conditions, such as rain event 500. At 602, capabilities of network nodes 600, which may be implemented as other network entities, base stations, and the like, are shared with network entity 105. At 603, capabilities of network nodes 601, which may be implemented as UEs or other LTE-enabled wireless devices, are shared with network entity 105. The sharing of such network node capabilities may be initiated by network nodes 600 and 601 autonomously sending a capabilities report to network entity 105 or may be transmitted in a request for capabilities from network entity 105.

The capabilities report transmitted from network nodes 600 and 601 to network entity 105 may include a list of polarization indicators identifying the polarizations supported for sensing by network nodes 600 and 601. The polarization indicators may further identify possible polarizations for transmit functions and possible polarizations for receive functions. The polarization indicator may further identify possible polarizations for different frequency bands and/or can indicate possible polarizations for analog, digital, and spatial beams.

At 604 and 605, network entity 105 transmits polarization configurations for network nodes 600 and 601, respectively. The polarization configurations include one or more transmit polarizations and one or more receive polarizations for PRS transmission and receipt of any reflection signals. The polarization configurations can describe the polarization state (e.g., linear [vertical/horizontal/diagonal], CW/CCW circular, or CW/CCW elliptical), polarization combining rules (e.g., using multiple polarizations and combining their measurements, such as coherent/noncoherent combing, special weighting of polarization components, and the like). The sets of polarizations within the polarization configurations may be selected by network entity 105 based on the capabilities of network nodes 600 and 601. Such that, if network node 600 does not have capabilities to handle certain polarizations, network entity 105 would provide polarizations that network node 600 can handle.

Additional or alternative aspects may provide polarization configurations of transmit and receive polarizations that include the description of polarizations for different frequency bands, for different digital, analog, or spatial beams, and/or may define a set or sequence of polarizations for each signal. Reporting aspects may also be included within the polarization configurations, such that the sensing network nodes, network nodes 600 and 601, may be configured with the periodicity or other triggering conditions for which to transmit the sensing measurement report.

It should be noted that, as with the capabilities report, the polarization configuration may be initiated by network entity 105 sending the polarization configuration to network nodes 600 and 601 or network nodes 600 and 601 may send a configuration request, to which the polarization configurations are sent by network entity 105 in response.

At 606, network nodes 601 transmit PRS(1) for sensing a target at a selected polarization within the transmit polarizations from the polarization configuration. At 607 and 608, network nodes 600 and 601 select an antenna port associated with a selected receive polarization from the polarization configuration for reception of reflection signals. Network nodes 600 and 601 receive reflections PRS(1$r$2) and PRS(1$r$1), respectively, and may perform sensing measurements on the reflections and determine whether the polarization of PRS(1$r$2) and PRS(1$r$1) correspond to the selected receive polarization.

At 609, network nodes 600 transmit PRS(2) for sensing a target at the selected transmit polarization from the polarization configuration. At 610 and 611, network nodes 600 and 601 select an antenna port associated with a selected receive polarization from the polarization configuration for reception of reflection signals. Network nodes 600 and 601 receive reflections PRS(2$r$2) and PRS(2$r$1), respectively, and may perform sensing measurements on the reflections and determine whether the polarization of PRS(2$r$2) and PRS(2$r$1) correspond to the selected receive polarization.

At 612 and 613, network nodes 600 and 601 transmits a sensing measurement report that includes the sensing measurement and an associated polarization indication of the received reflected signals. At 614, network entity 105 may then use the sensing measurements and polarization indications to resolve the target sensing by determining whether the reflection signals indicate sensing of the target or whether the reflection signals are clutter.

Figure 7:
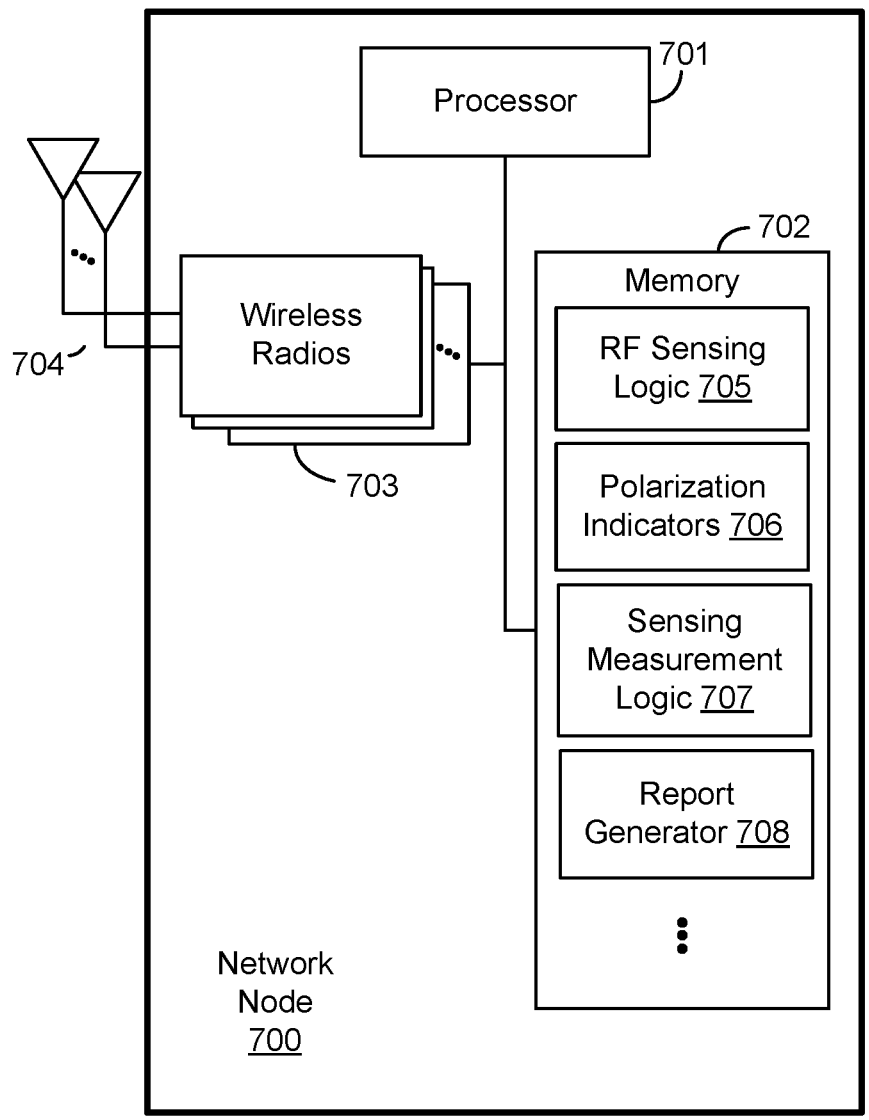
FIG. 7 is a block diagram of an example network node that supports 5G NR RF sensing with polarization configuration according to one or more aspects.

FIG. 7 is a block diagram of an example network node 700 that supports 5G NR RF sensing with polarization configuration according to one or more aspects. Network node 700 may be configured to perform operations, including the blocks of a process described with reference to FIG. 4A. Network node 700 includes a processor 701, memory 702, wireless radios 703, and antennas 704. Memory 702 may store information and logic, which, when executed by processor 701, implements the features and functionality of network node 700. Wireless radios 703 may include transmit and receive functionalities that code signals to be transmitted via antennas 704 and decodes detected signals via antennas 704.

In certain implementations, network node 700 may be implemented as a UE, such as UE 115, including the structure, hardware, and components shown and described with reference to UE 115 of FIGS. 1-2. In such UE implementations of network node 700, processor 701 may correspond to controller 280, which operates to execute logic or computer instructions stored in memory 282, as well as controlling the components of network node 700 that provide its features and functionality. A UE implementation of network node 700, under control of processor 701, transmits and receives signals via wireless radios 703 and antennas 704, where wireless radios 703 may correspond to various components and hardware, as illustrated in FIG. 2 for UE 115, including modulator and demodulators 254*a-r*, MIMO detector 256, receive processor 258, transmit processor 264, and TX MIMO processor 266.

In certain other implementations, network node 700 may be implemented as a network entity, such as network entity 105 or base station 140, including the structure, hardware, and components shown and described with reference to network entity 105 or base station 140 of FIGS. 1-2. In such network entity implementations of network node 700, processor 701 may correspond to controller 240, which operates to execute logic or computer instructions stored in memory 242, as well as controlling the components of network node 700 that provide its features and functionality. A network entity implementation of network node 700, under control of processor 701, transmits and receives signals via wireless radios 703 and antennas 704, where wireless radios 703 may correspond to various components and hardware, as illustrated in FIG. 2 for base station 140, including modulator and demodulators 232*a-t*, MIMO detector 236, receive processor 238, transmit processor 220, and TX MIMO processor 230.

Figure 8:
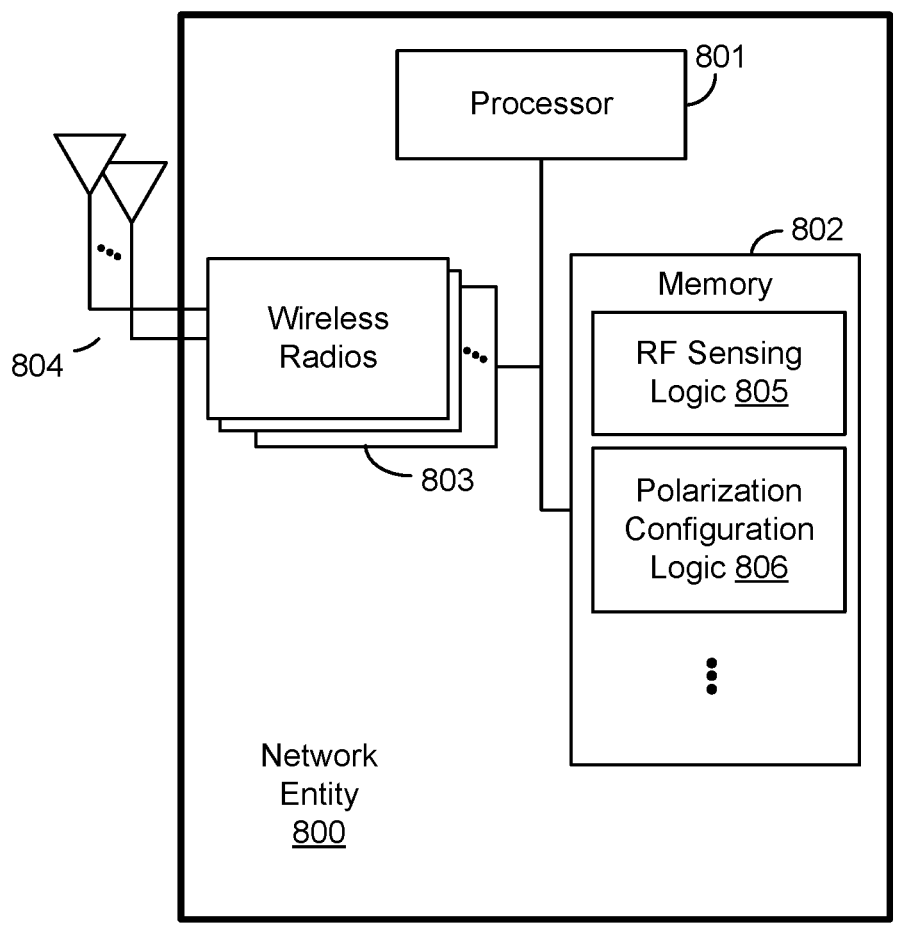
FIG. 8 is a block diagram of an example network entity that supports 5G NR RF sensing with polarization configuration according to one or more aspects.

As shown, memory 702 may include RF sensing logic 705, polarization indicators 706, sensing measurement logic 707, and report generator 708. RF sensing logic 705 includes the code and computer instructions that, when executed by processor 701 (referred to herein as the "execution environment" of RF sensing logic 705), implements the features and functionality of RF sensing services. Polarization indicators 706 include one or more polarization indicators for either transmit or receive sensing functionality as received from a network entity managing the 5G NR RF sensing service. Sensing measurement logic 707 includes the code and computer instructions that, when executed by processor 702, implements the features and functionality for conducting measurements on PRS and reflections of PRS to produce sensing measurement information. Report generator 708 includes the code and computer instructions that, when executed by processor 701, implements the features and functionality to generate a sensing measurement report that includes the sensing measurements information resulting from the measurements of PRS and reflections of PRS in additional to identifying a polarization associated with the measured signals. Network node 700 may receive signals from or transmit signals to one or more UEs or network entities, such as UE 115, network entities 105, and base station 140 of FIGS. 1-2 or a network entity, such as network entity 800, as illustrated in FIG. 8.

Network node 700, under control of processor 701, may execute RF sensing logic 705, stored in memory 702. The execution environment of RF sensing logic 705 implements RF sensing functionality at network node 700. Within the execution environment of RF sensing logic 705, network node 700 may transmit, via wireless radios 703 and antennas 704, a capabilities report to a network entity managing a 5G NR RF sensing service. The capabilities report may be initiated by network node 700 or may be in response to a request for sensing capabilities received by the network entity. Network node 700 may also receive a polarization configuration from the network entity via antennas 704 and wireless radios 703. The polarization configuration includes a set of recommended transmit and receive polarizations. Network node 700 would store such recommended polarizations in memory 702 at polarization indicators 706.

Within the execution environment of RF sensing logic 705, network node 700 may transmit PRS using a selected transmit polarization stored in polarization indicators 706. Network node 700 would identify the antenna port within antennas 704 that is associated with the transmit polarization. Also within the execution environment of RF sensing logic 705, network node 700 may receive PRS reflection signals, including reflection signals from PRS that it has transmitted and PRS reflection signals from PRS transmitted from other sensing network nodes. Prior to receiving, network node 700 may selected a receive polarization from polarization indicators 706. Network node 700 may then identify an antenna port of antennas 704 that is associated with the selected receive polarization. Thus, when receiving a reflection of a PRS, network node 700 would receive the signal using the receive polarization at antennas 704.

It should be noted that, in some example operations, network node 700 would not transmit a PRS but would select a receive polarization from polarization indicators 706 and identify an antenna port of antennas 704 associated with the receive polarization in order to receive reflections of PRS transmitted by other network nodes.

On receipt of PRS reflection signals, network node 700, under control of processor 701, executes sensing measurement logic 707. The execution environment of sensing measurement logic 707 implements the functionality at network node 700 to measure characteristics of the received PRS reflection including the polarization of the received reflection. Measurements may include characteristics such as the time of arrival, reference signal time difference, observed time different of arrival, and the like. Network node 700, under control of processor 701, may execute report generator 708, stored in memory 702. Within the execution environment of report generator 708, network node 700 generates a sensing measurement report that includes the sensing measurements performed along with the polarization of the received PRS reflections that were measured and transmits the sensing measurement report to the network entity via wireless radios 703 and antennas 704.

FIG. 8 is a block diagram of an example network entity 800 that supports 5G NR RF sensing with polarization configuration according to one or more aspects. Network entity 800 may be configured to perform operations, including the blocks of a process described with reference to FIG. 4B. Network entity 800 includes a processor 801, memory 802, wireless radios 803, and antennas 804. Memory 802 may store information and logic, which, when executed by processor 801, implements the features and functionality of network entity 800. Wireless radios 803 may include transmit and receive functionalities that code signals to be transmitted via antennas 804 and decodes detected signals via antennas 804.

In certain implementations, network entity 800 may comprise a network entity, such as network entity 105 illustrated in FIGS. 1-2. In such network entity implementations of network entity 800, processor 801 may correspond to controller 240, which operates to execute logic or computer instructions stored in memory 242, as well as controlling the components of network entity 800 that provide its features and functionality. A network entity implementation of network entity 800, under control of processor 801, transmits and receives signals via wireless radios 803 and antennas 804, where wireless radios 803 may correspond to various components and hardware, as illustrated in FIG. 2 for base station 140, including modulator and demodulators 232*a-t*, MIMO detector 236, receive processor 238, transmit processor 220, and TX MIMO processor 230.

In certain other implementations, network entity 800 may comprise a sensing server, such as an LMF or SnMF. Such a sensing server implementation of network entity 800 may be a physical or logical entity within a 5G network. The sensing server implementations of network entity 800 may have its own wireless radios 803 and antennas 804, but may also, as a logical entity of another physical entity, may rely on wireless radios 803 and antennas 804 of an associated network entity.

As shown, memory 802 may include RF sensing logic 802 and polarization configuration logic 806. RF sensing logic 805 includes the code and computer instructions that, when executed by processor 801, implements the features and functionality of RF sensing services. Polarization configuration logic 806 includes the code and computer instructions that, when executed by processor 801, implements the features and functionality to configure the set of transmit and receive polarizations for 5G NR RF sensing services and to generate a polarization configuration message for each sensing network node participating in the sensing service.

Network entity 800, under control of processor 801, may execute RF sensing logic 805, stored in memory 802. The execution environment of RF sensing logic 805 implements 5G NR RF sensing functionality at network entity 800. Within the execution environment of RF sensing logic 805, network entity 800 may receive, via wireless radios 803 and antennas 804, a capabilities report from participating sensing network nodes. The capabilities report may be received from the participating network nodes in response to a request transmitted via wireless radios 803 and antennas 804 from network entity 800.

Within the execution environment of RF sensing logic 802, network entity 800, under control of processor 801, executes polarization configuration logic 806. The execution environment of polarization configuration logic 806 uses the capabilities received from the participating sensing network nodes to generate a polarization configuration that includes a set of recommended transmit and receive polarizations for network nodes to use when transmitting PRS and receiving PRS reflections for the RF sensing process. Network entity 800 may then transmit the polarization configuration to the participating sensing network nodes via wireless radios 803 and antennas 804. Further within the execution environment of RF sensing logic 802, network entity 800 may receive sensing measurement reports from the participating sensing network nodes via antennas 804 and wireless radios 803 and use the sensing measurement information and associated polarization of the sensed signals to determine the sensing or positioning information of a certain target. Network entity 800 may further distinguish clutter sources by comparing the sensing measurements and associated polarization to the recommended polarizations that were transmitted in the polarization configuration.

It is noted that one or more blocks (or operations) described with reference to FIGS. 4A and 4B may be combined with one or more blocks (or operations) described with reference to another of the figures. For example, one or more blocks (or operations) of FIG. 4A may be combined with one or more blocks (or operations) of FIG. 5. As another example, one or more blocks associated with FIG. 4B may be combined with one or more blocks associated with FIG. 6. As another example, one or more blocks associated with FIGS. 4A and 4B may be combined with one or more blocks (or operations) associated with FIGS. 1 and 2. Additionally, or alternatively, one or more operations described above with reference to FIGS. 1 and 2 may be combined with one or more operations described with reference to FIG. 7 or 8.

In one or more aspects, techniques for supporting 5G NR RF sensing with polarization configuration may include additional aspects, such as any single aspect or any combination of aspects described below or in connection with one or more other processes or devices described elsewhere herein. In a first aspect, supporting 5G NR RF sensing with polarization configuration may include a network node may be configured to perform a method including receiving a first polarization indicator and a second polarization indicator from a network entity, the first polarization indicator associated with transmission of a first reference sensing signal and the second polarization indicator associated with reception of a second reference sensing signal, performing sensing measurements using the first polarization indicator and the second polarization indicator, and transmitting a sensing measurement report including the sensing measurements associated with the second reference sensing signal to the network entity.

Additionally, the network node may perform or operate according to one or more aspects as described below. In some implementations, the network node includes a wireless device, such as a UE or a base station. In some implementations, the network node may include at least one processor, and a memory coupled to the processor. The processor may be configured to perform operations described herein with respect to the network node. In some other implementations, the network node may include a non-transitory computer-readable medium having program code recorded thereon and the program code may be executable by a computer for causing the computer to perform operations described herein with reference to the network node. In some implementations, the network node may include one or more means configured to perform operations described herein. In some implementations, a method of wireless communication may include one or more operations described herein with reference to the network node.

In a second aspect, alone or in combination with the first aspect, wherein the first reference sensing signal and the second reference sensing signal are a same signal.

In a third aspect, alone or in combination with one or more of the first aspect and the second aspect, wherein the sensing measurements include a measured signal parameter and an associated polarization indication of a measured signal.

In a fourth aspect, alone or in combination with one or more of the first aspect through the third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a fifth aspect, alone or in combination with one or more of the first aspect through the fourth aspect, further including: receiving a configuration signal from the network entity, wherein the configuration signal includes an activation indicator that activates one or more of the set of polarizations associated with the first reference sensing signal and the second reference sensing signal.

In a sixth aspect, alone or in combination with one or more of the first aspect through the fifth aspect, wherein the first polarization indicator and the second polarization indicator further include one or more of: a polarization state; and a set of combining rules associated with use, by the network node, of a plurality of polarizations in the performing the sensing measurements, the set of combining rules configuring the network node to combine the sensing measurements associated with the plurality of polarizations.

In a seventh aspect, alone or in combination with one or more of the first aspect through the sixth aspect, further including: transmitting a request for polarization configuration to the network entity, wherein the transmitting the request occurs prior to the receiving the first polarization indicator and the second polarization indicator.

In an eighth aspect, alone or in combination with one or more of the first aspect through the seventh aspect, further including: transmitting a capabilities indicator to the network entity, the capabilities indicator identifying a set of polarizations supported by the network node.

In a ninth aspect, alone or in combination with one or more of the first aspect through the eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a tenth aspect, alone or in combination with one or more of the first aspect through the ninth aspect, further including: receiving a capabilities request message from the network entity, wherein the transmitting the capabilities indicator is in response to the capabilities request.

An eleventh aspect may include a network node comprising a memory storing processor-readable code; and at least one processor coupled to the memory, the at least one processor configured to execute the processor-readable code to cause the at least one processor to receive a first polarization indicator and a second polarization indicator from a network entity, the first polarization indicator associated with transmission of a first reference sensing signal and the second polarization indicator associated with reception of a second reference sensing signal; perform sensing measurements using the first polarization indicator and the second polarization indicator; and transmit a sensing measurement report including the sensing measurements associated with the second reference sensing signal to the network entity.

In a twelfth aspect, alone or in combination with the eleventh aspect, wherein the first reference sensing signal and the second reference sensing signal are a same signal.

In a thirteenth aspect, alone or in combination with one or more of the eleventh aspect and the twelfth aspect, wherein the sensing measurements include a measured signal parameter and an associated polarization indication of a measured signal.

In a fourteenth aspect, alone or in combination with one or more of the eleventh aspect through the thirteenth aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a fifteenth aspect, alone or in combination with one or more of the eleventh aspect through the fourteenth aspect, further including configuration of the at least one processor to: receive a configuration signal from the network entity, wherein the configuration signal includes an activation indicator that activates one or more of the set of polarizations associated with the first reference sensing signal and the second reference sensing signal.

In a sixteenth aspect, alone or in combination with one or more of the eleventh aspect through the fifteenth aspect, wherein the first polarization indicator and the second polarization indicator further include one or more of: a polarization state; and a set of combining rules associated with use, by the network node, of a plurality of polarizations in execution of the configuration of the at least one processor to perform the sensing measurements, the set of combining rules configuring the network node to combine the sensing measurements associated with the plurality of polarizations.

In a seventeenth aspect, alone or in combination with one or more of the eleventh aspect through the sixteenth aspect, further including configuration of the at least one processor to: transmit a request for polarization configuration to the network entity, wherein the configuration of the at least one processor to transmit the request occurs prior to execution of the configuration of the at least one processor to receive the first polarization indicator and the second polarization indicator.

In an eighteenth aspect, alone or in combination with one or more of the eleventh aspect through the seventeenth aspect, further including configuration of the at least one processor to: transmit a capabilities indicator to the network entity, the capabilities indicator identifying a set of polarizations supported by the network node.

In a nineteenth aspect, alone or in combination with one or more of the eleventh aspect through the eighteenth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a twentieth aspect, alone or in combination with one or more of the eleventh aspect through the nineteenth aspect, further including configuration of the at least one processor to: receive a capabilities request message from the network entity, wherein the configuration of the at least one processor to transmit the capabilities indicator is executed in response to the capabilities request.

A twenty-first aspect may include a network node configured for wireless communication, the network node comprising means for receiving a first polarization indicator and a second polarization indicator from a network entity, the first polarization indicator associated with transmission of a first reference sensing signal and the second polarization indicator associated with reception of a second reference sensing signal; means for performing sensing measurements using the first polarization indicator and the second polarization indicator; and means for transmitting a sensing measurement report including the sensing measurements associated with the second reference sensing signal to the network entity.

In a twenty-second aspect, alone or in combination with the twenty-first aspect, wherein the first reference sensing signal and the second reference sensing signal are a same signal.

In a twenty-third aspect, alone or in combination with one or more of the twenty-first aspect and the twenty-second aspect, wherein the sensing measurements include a measured signal parameter and an associated polarization indication of a measured signal.

In a twenty-fourth aspect, alone or in combination with one or more of the twenty-first aspect through the twenty-third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a twenty-fifth aspect, alone or in combination with one or more of the twenty-first aspect through the twenty-fourth aspect, further including: means for receiving a configuration signal from the network entity, wherein the configuration signal includes an activation indicator that activates one or more of the set of polarizations associated with the first reference sensing signal and the second reference sensing signal.

In a twenty-sixth aspect, alone or in combination with one or more of the twenty-first aspect through the twenty-fifth aspect, wherein the first polarization indicator and the second polarization indicator further include one or more of: a polarization state; and a set of combining rules associated with use, by the network node, of a plurality of polarizations in execution of the means for performing the sensing measurements, the set of combining rules configuring the network node to combine the sensing measurements associated with the plurality of polarizations.

In a twenty-seventh aspect, alone or in combination with one or more of the twenty-first aspect through the twenty-sixth aspect, further including: means for transmitting a request for polarization configuration to the network entity, wherein the means for transmitting the request occurs prior to execution of the means for receiving the first polarization indicator and the second polarization indicator.

In a twenty-eighth aspect, alone or in combination with one or more of the twenty-first aspect through the twenty-seventh aspect, further including: means for transmitting a capabilities indicator to the network entity, the capabilities indicator identifying a set of polarizations supported by the network node.

In a twenty-ninth aspect, alone or in combination with one or more of the twenty-first aspect through the twenty-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a thirtieth aspect, alone or in combination with one or more of the twenty-first aspect through the twenty-ninth aspect, further including: means for receiving a capabilities request message from the network entity, wherein the means for transmitting the capabilities indicator is executed in response to the capabilities request.

A thirty-first aspect may include a non-transitory computer-readable medium storing instructions that, when executed by a processor of a network node, cause the processor to perform operations comprising receiving a first polarization indicator and a second polarization indicator from a network entity, the first polarization indicator associated with transmission of a first reference sensing signal and the second polarization indicator associated with reception of a second reference sensing signal; performing sensing measurements using the first polarization indicator and the second polarization indicator; and transmitting a sensing measurement report including the sensing measurements associated with the second reference sensing signal to the network entity.

In a thirty-second aspect, alone or in combination with the thirty-first aspect, wherein the first reference sensing signal and the second reference sensing signal are a same signal.

In a thirty-third aspect, alone or in combination with one or more of the thirty-first aspect and the thirty-second aspect, wherein the sensing measurements include a measured signal parameter and an associated polarization indication of a measured signal.

In a thirty-fourth aspect, alone or in combination with one or more of the thirty-first aspect through the thirty-third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a thirty-fifth aspect, alone or in combination with one or more of the thirty-first aspect through the thirty-fourth aspect, further including instructions that cause the processor to perform: receiving a configuration signal from the network entity, wherein the configuration signal includes an activation indicator that activates one or more of the set of polarizations associated with the first reference sensing signal and the second reference sensing signal.

In a thirty-sixth aspect, alone or in combination with one or more of the thirty-first aspect through the thirty-fifth aspect, wherein the first polarization indicator and the second polarization indicator further include one or more of: a polarization state; and a set of combining rules associated with use, by the network node, of a plurality of polarizations in execution of the instructions that cause the processor to perform performing the sensing measurements, the set of combining rules configuring the network node to combine the sensing measurements associated with the plurality of polarizations.

In a thirty-seventh aspect, alone or in combination with one or more of the thirty-first aspect through the thirty-sixth aspect, further including instructions that cause the processor to perform: transmitting a request for polarization configuration to the network entity, wherein execution of the instructions that cause the processor to perform transmitting the request occurs prior to execution of the instructions that cause the processor to perform receiving the first polarization indicator and the second polarization indicator.

In a thirty-eighth aspect, alone or in combination with one or more of the thirty-first aspect through the thirty-seventh aspect, further including instructions that cause the processor to perform: transmitting a capabilities indicator to the network entity, the capabilities indicator identifying a set of polarizations supported by the network node.

In a thirty-ninth aspect, alone or in combination with one or more of the thirty-first aspect through the thirty-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a fortieth aspect, alone or in combination with one or more of the thirty-first aspect through the thirty-ninth aspect, further including instructions that cause the processor to perform: receiving a capabilities request message from the network entity, wherein the instructions that cause the processor to perform transmitting the capabilities indicator are executed in response to the capabilities request.

In one or more aspects, techniques for supporting 5G NR RF sensing with polarization configuration may include additional aspects, such as any single aspect or any combination of aspects described below or in connection with one or more other processes or devices described elsewhere herein. In a forty-first aspect, supporting 5G NR RF sensing with polarization configuration may include a network entity configured to perform a method including transmitting a first polarization indicator and a second polarization indicator to one or more network nodes, the first polarization indicator associated with transmission of a first reference sensing signal and the second polarization indicator associated with reception of a second reference sensing signal, and receiving a sensing measurement report including sensing measurements associated with the second reference sensing signal from the one or more network nodes.

Additionally, the network entity may perform or operate according to one or more aspects as described below. In some implementations, the network entity includes a wireless device, such as a base station, a location server, or the like. In some implementations, the network entity may include at least one processor, and a memory coupled to the processor. The processor may be configured to perform operations described herein with respect to the network entity. In some other implementations, the network entity may include a non-transitory computer-readable medium having program code recorded thereon and the program code may be executable by a computer for causing the computer to perform operations described herein with reference to the network entity. In some implementations, the network entity may include one or more means configured to perform operations described herein. In some implementations, a method of wireless communication may include one or more operations described herein with reference to the network entity.

In a forty-second aspect, alone or in combination with the forty-first aspect, wherein the first reference sensing signal and the second reference sensing signal are a same signal.

In a forty-third aspect, alone or in combination with one or more of the forty-first aspect and the forty-second aspect, wherein the sensing measurements include a measured signal parameter and an associated polarization indication of a measured signal.

In a forty-fourth aspect, alone or in combination with one or more of the forty-first aspect through the forty-third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a forty-fifth aspect, alone or in combination with one or more of the forty-first aspect through the forty-fourth aspect, further including: transmitting a configuration signal to the one or more network nodes, wherein the configuration signal includes an activation indicator that activates one or more of the set of polarizations associated with the first reference sensing signal and the second reference sensing signal.

In a forty-sixth aspect, alone or in combination with one or more of the forty-first aspect through the forty-fifth aspect, wherein the first polarization indicator and the second polarization indicator further include one or more of: a polarization state; and a set of combining rules associated with use of a plurality of polarizations associated with the sensing measurements, the set of combining rules to configure the one or more network nodes to combine the sensing measurements associated with the plurality of polarizations.

In a forty-seventh aspect, alone or in combination with one or more of the forty-first aspect through the forty-sixth aspect, further including: receiving a request for polarization configuration from the one or more network nodes, wherein the receiving the request occurs prior to the transmitting the first polarization indicator and the second polarization indicator.

In a forty-eighth aspect, alone or in combination with one or more of the forty-first aspect through the forty-seventh aspect, further including: receiving a capabilities indicator from the one or more network nodes, the capabilities indicator identifying a set of polarizations supported by the one or more network nodes.

In a forty-ninth aspect, alone or in combination with one or more of the forty-first aspect through the forty-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a fiftieth aspect, alone or in combination with one or more of the forty-first aspect through the forty-ninth aspect, further including: transmitting a capabilities request message to the one or more network nodes, wherein the transmitting the capabilities indicator occurs prior to the receiving the capabilities indicator.

A fifty-first aspect may include a network entity comprising a memory storing processor-readable code; and at least one processor coupled to the memory, the at least one processor configured to execute the processor-readable code to cause the at least one processor to transmit a first polarization indicator and a second polarization indicator to one or more network nodes, the first polarization indicator associated with transmission of a first reference sensing signal and the second polarization indicator associated with reception of a second reference sensing signal; and receive a sensing measurement report including sensing measurements associated with the second reference sensing signal from the one or more network nodes.

In a fifty-second aspect, alone or in combination with the fifty-first aspect, wherein the first reference sensing signal and the second reference sensing signal are a same signal.

In a fifty-third aspect, alone or in combination with one or more of the fifty-first aspect and the fifty-second aspect, wherein the sensing measurements include a measured signal parameter and an associated polarization indication of a measured signal.

In a fifty-fourth aspect, alone or in combination with one or more of the fifty-first aspect through the fifty-third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a fifty-fifth aspect, alone or in combination with one or more of the fifty-first aspect through the fifty-fourth aspect, further including configuration of the at least one processor to: transmit a configuration signal to the one or more network nodes, wherein the configuration signal includes an activation indicator that activates one or more of the set of polarizations associated with the first reference sensing signal and the second reference sensing signal.

In a fifty-sixth aspect, alone or in combination with one or more of the fifty-first aspect through the fifty-fifth aspect, wherein the first polarization indicator and the second polarization indicator further include one or more of: a polarization state; and a set of combining rules associated with use of a plurality of polarizations associated with the sensing measurements, the set of combining rules to configure the one or more network nodes to combine the sensing measurements associated with the plurality of polarizations.

In a fifty-seventh aspect, alone or in combination with one or more of the fifty-first aspect through the fifty-sixth aspect, further including configuration of the at least one processor to: receive a request for polarization configuration from the one or more network nodes, wherein the configuration of the at least one processor to receive the request occurs prior to execution of the configuration of the at least one processor to transmit the first polarization indicator and the second polarization indicator.

In a fifty-eighth aspect, alone or in combination with one or more of the fifty-first aspect through the fifty-seventh aspect, further including configuration of the at least one processor to: receive a capabilities indicator from the one or more network nodes, the capabilities indicator identifying a set of polarizations supported by the one or more network nodes.

In a fifty-ninth aspect, alone or in combination with one or more of the fifty-first aspect through the fifty-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a sixtieth aspect, alone or in combination with one or more of the fifty-first aspect through the fifty-ninth aspect, further including configuration of the at least one processor to: transmit a capabilities request message to the one or more network nodes, wherein the configuration of the at least one processor to transmit the capabilities indicator occurs prior to execution of the configuration of the at least one processor to receive the capabilities indicator.

A sixty-first aspect may include a network entity configured for wireless communication, the network entity comprising means for transmitting a first polarization indicator and a second polarization indicator to one or more network nodes, the first polarization indicator associated with transmission of a first reference sensing signal and the second polarization indicator associated with reception of a second reference sensing signal; and means for receiving a sensing measurement report including sensing measurements associated with the second reference sensing signal from the one or more network nodes.

In a sixty-second aspect, alone or in combination with the sixty-first aspect, wherein the first reference sensing signal and the second reference sensing signal are a same signal.

In a sixty-third aspect, alone or in combination with one or more of the sixty-first aspect and the sixty-second aspect, wherein the sensing measurements include a measured signal parameter and an associated polarization indication of a measured signal.

In a sixty-fourth aspect, alone or in combination with one or more of the sixty-first aspect through the sixty third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a sixty-fifth aspect, alone or in combination with one or more of the sixty-first aspect through the sixty-fourth aspect, further including: means for transmitting a configuration signal to the one or more network nodes, wherein the configuration signal includes an activation indicator that activates one or more of the set of polarizations associated with the first reference sensing signal and the second reference sensing signal.

In a sixty-sixth aspect, alone or in combination with one or more of the sixty-first aspect through the sixty-fifth aspect, wherein the first polarization indicator and the second polarization indicator further include one or more of: a polarization state; and a set of combining rules associated with use of a plurality of polarizations associated with the sensing measurements, the set of combining rules to configure the one or more network nodes to combine the sensing measurements associated with the plurality of polarizations.

In a sixty-seventh aspect, alone or in combination with one or more of the sixty-first aspect through the sixty-sixth aspect, further including: means for receiving a request for polarization configuration from the one or more network nodes, wherein the means for receiving the request occurs prior to execution of the means for transmitting the first polarization indicator and the second polarization indicator.

In a sixty-eighth aspect, alone or in combination with one or more of the sixty-first aspect through the sixty-seventh aspect, further including: means for receiving a capabilities indicator from the one or more network nodes, the capabilities indicator identifying a set of polarizations supported by the one or more network nodes.

In a sixty-ninth aspect, alone or in combination with one or more of the sixty-first aspect through the sixty-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In a seventieth aspect, alone or in combination with one or more of the sixty-first aspect through the sixty-ninth aspect, further including: means for transmitting a capabilities request message to the one or more network nodes, wherein the means for transmitting the capabilities indicator occurs prior to execution of the means for receiving the capabilities indicator.

A seventy-first aspect may include a non-transitory computer-readable medium storing instructions that, when executed by a processor of a network entity, cause the processor to perform operations comprising transmitting a first polarization indicator and a second polarization indicator to one or more network nodes, the first polarization indicator associated with transmission of a first reference sensing signal and the second polarization indicator associated with reception of a second reference sensing signal; and receiving a sensing measurement report including sensing measurements associated with the second reference sensing signal from the one or more network nodes.

In a seventy-second aspect, alone or in combination with the seventy-first aspect, wherein the first reference sensing signal and the second reference sensing signal are a same signal.

In a seventy-third aspect, alone or in combination with one or more of the seventy-first aspect and the seventy-second aspect, wherein the sensing measurements include a measured signal parameter and an associated polarization indication of a measured signal.

In a seventy-fourth aspect, alone or in combination with one or more of the seventy-first aspect through the seventy-third aspect, wherein the first polarization indicator and the second polarization indicator include one or more of: a polarization corresponding to each frequency band of a plurality of frequency bands; the polarization corresponding to each frequency band of a plurality of beams; a set of polarizations associated with each of the first reference sensing signal and the second reference sensing signal; and a reporting configuration associated with the sensing measurement report.

In a seventy-fifth aspect, alone or in combination with one or more of the seventy-first aspect through the seventy-fourth aspect, further including instructions that cause the processor to perform: transmitting a configuration signal to the one or more network nodes, wherein the configuration signal includes an activation indicator that activates one or more of the set of polarizations associated with the first reference sensing signal and the second reference sensing signal.

In a seventy-sixty aspect, alone or in combination with one or more of the seventy-first aspect through the seventy-fifth aspect, wherein the first polarization indicator and the second polarization indicator further include one or more of: a polarization state; and a set of combining rules associated with use of a plurality of polarizations associated with the sensing measurements, the set of combining rules to configure the one or more network nodes to combine the sensing measurements associated with the plurality of polarizations.

In a seventy-seventh aspect, alone or in combination with one or more of the seventy-first aspect through the seventy-sixth aspect, further including instructions that cause the processor to perform: receiving a request for polarization configuration from the one or more network nodes, wherein execution of the instructions that cause the processor to perform receiving the request occurs prior to execution of the instructions that cause the processor to perform transmitting the first polarization indicator and the second polarization indicator.

In a seventy-eighth aspect, alone or in combination with one or more of the seventy-first aspect through the seventy-seventh aspect, further including instructions that cause the processor to perform: receiving a capabilities indicator from the one or more network nodes, the capabilities indicator identifying a set of polarizations supported by the one or more network nodes.

In a seventy-ninth aspect, alone or in combination with one or more of the seventy-first aspect through the seventy-eighth aspect, wherein the capabilities indicator further includes one or more of: a set of candidate transmission polarizations and a set of candidate reception polarizations; a set of candidate band-specific polarizations associated with each frequency band of a plurality of frequency bands; and a set of candidate beam polarizations associated with each beam of a plurality of beams.

In an eightieth aspect, alone or in combination with one or more of the seventy-first aspect through the seventy-ninth aspect, further including instructions that cause the processor to perform: transmitting a capabilities request message to the one or more network nodes, wherein execution of the instructions that cause the processor to perform transmitting the capabilities indicator occurs prior to execution of the instructions that cause the processor to perform receiving the capabilities indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network node, the method comprising:
   receiving a first polarization indicator and a second polarization indicator from a network entity, the first polarization indicator associated with transmission of a first reference sensing signal and the second polarization indicator associated with reception of a second reference sensing signal after being reflected off a target to be sensed;
   performing sensing measurements using the first polarization indicator and the second polarization indicator; and
   transmitting a sensing measurement report including the sensing measurements associated with the second reference sensing signal to the network entity.

2. The method of claim 1, wherein the first reference sensing signal and the second reference sensing signal are a same signal.

3. The method of claim 1, wherein the sensing measurements include a measured signal parameter and an associated polarization indication of a measured signal.

4. The method of claim 1, wherein the first polarization indicator and the second polarization indicator include one or more of:
   a polarization corresponding to each frequency band of a plurality of frequency bands;
   the polarization corresponding to each frequency band of a plurality of beams;
   a set of polarizations associated with each of the first reference sensing signal and the second reference sensing signal; and a reporting configuration associated with the sensing measurement report.

5. The method of claim 4, further including:
receiving a configuration signal from the network entity, wherein the configuration signal includes an activation indicator that activates one or more of the set of polarizations associated with the first reference sensing signal and the second reference sensing signal.

6. The method of claim 4, wherein the first polarization indicator and the second polarization indicator further include one or more of:
a polarization state; and
a set of combining rules associated with use, by the network node, of a plurality of polarizations in the performing the sensing measurements, the set of combining rules configuring the network node to combine the sensing measurements associated with the plurality of polarizations.

7. The method of claim 1, further including:
transmitting a request for polarization configuration to the network entity, wherein the transmitting the request occurs prior to the receiving the first polarization indicator and the second polarization indicator.

8. The method of claim 1, further including:
transmitting a capabilities indicator to the network entity, the capabilities indicator identifying a set of polarizations supported by the network node.

9. The method of claim 8, wherein the capabilities indicator further includes one or more of:
a set of candidate transmission polarizations and a set of candidate reception polarizations;
a set of candidate band-specific polarizations associated with each frequency band of a plurality of frequency bands; and
a set of candidate beam polarizations associated with each beam of a plurality of beams.

10. The method of claim 8, further including:
receiving a capabilities request message from the network entity, wherein the transmitting the capabilities indicator is in response to the capabilities request.

11. A method of wireless communication performed by a network entity, the method comprising:
transmitting a first polarization indicator and a second polarization indicator to one or more network nodes, the first polarization indicator associated with transmission of a first reference sensing signal and the second polarization indicator associated with reception of a second reference sensing signal after being reflected off a target to be sensed; and
receiving a sensing measurement report including sensing measurements associated with the second reference sensing signal from the one or more network nodes.

12. The method of claim 11, wherein the first reference sensing signal and the second reference sensing signal are a same signal.

13. The method of claim 11, wherein the sensing measurements include a measured signal parameter and an associated polarization indication of a measured signal.

14. The method of claim 11, wherein the first polarization indicator and the second polarization indicator include one or more of:
a polarization corresponding to each frequency band of a plurality of frequency bands;
the polarization corresponding to each frequency band of a plurality of beams;

a set of polarizations associated with each of the first reference sensing signal and the second reference sensing signal; and
a reporting configuration associated with the sensing measurement report.

15. The method of claim 14, further including:
transmitting a configuration signal to the one or more network nodes, wherein the configuration signal includes an activation indicator that activates one or more of the set of polarizations associated with the first reference sensing signal and the second reference sensing signal.

16. The method of claim 14, wherein the first polarization indicator and the second polarization indicator further include one or more of:
a polarization state; and
a set of combining rules associated with use of a plurality of polarizations associated with the sensing measurements, the set of combining rules to configure the one or more network nodes to combine the sensing measurements associated with the plurality of polarizations.

17. The method of claim 11, further including:
receiving a request for polarization configuration from the one or more network nodes, wherein the receiving the request occurs prior to the transmitting the first polarization indicator and the second polarization indicator.

18. The method of claim 11, further including:
receiving a capabilities indicator from the one or more network nodes, the capabilities indicator identifying a set of polarizations supported by the one or more network nodes.

19. The method of claim 18, wherein the capabilities indicator further includes one or more of:
a set of candidate transmission polarizations and a set of candidate reception polarizations;
a set of candidate band-specific polarizations associated with each frequency band of a plurality of frequency bands; and
a set of candidate beam polarizations associated with each beam of a plurality of beams.

20. The method of claim 18, further including:
transmitting a capabilities request message to the one or more network nodes, wherein the transmitting the capabilities request occurs prior to the receiving the capabilities indicator.

21. A network node comprising:
a memory storing processor-readable code; and
at least one processor coupled to the memory, the at least one processor configured to execute the processor-readable code to cause the at least one processor to:
receive a first polarization indicator and a second polarization indicator from a network entity, the first polarization indicator associated with transmission of a first reference sensing signal and the second polarization indicator associated with reception of a second reference sensing signal after being reflected off a target to be sensed;
perform sensing measurements using the first polarization indicator and the second polarization indicator; and
transmit a sensing measurement report including the sensing measurements associated with the second reference sensing signal to the network entity.

22. The network node of claim 21, further including configuration of the at least one processor to:
transmit a request for polarization configuration to the network entity, wherein the configuration of the at least one processor to transmit the request occurs prior to execution of the configuration of the at least one processor to receive the first polarization indicator and the second polarization indicator.

23. The network node of claim 21, further including configuration of the at least one processor to:
transmit a capabilities indicator to the network entity, the capabilities indicator identifying a set of polarizations supported by the network node.

24. The network node of claim 23, wherein the capabilities indicator further includes one or more of:
a set of candidate transmission polarizations and a set of candidate reception polarizations;
a set of candidate band-specific polarizations associated with each frequency band of a plurality of frequency bands; and
a set of candidate beam polarizations associated with each beam of a plurality of beams.

25. The network node of claim 23, further including configuration of the at least one processor to:
receive a capabilities request message from the network entity, wherein the configuration of the at least one processor to transmit the capabilities indicator is executed in response to the capabilities request.

26. A network entity comprising:
a memory storing processor-readable code; and
at least one processor coupled to the memory, the at least one processor configured to execute the processor-readable code to cause the at least one processor to:
transmit a first polarization indicator and a second polarization indicator to one or more network nodes, the first polarization indicator associated with transmission of a first reference sensing signal and the second polarization indicator associated with reception of a second reference sensing signal after being reflected off a target to be sensed; and
receive a sensing measurement report including sensing measurements associated with the second reference sensing signal from the one or more network nodes.

27. The network entity of claim 26, wherein the first polarization indicator and the second polarization indicator include one or more of:
a polarization corresponding to each frequency band of a plurality of frequency bands;
the polarization corresponding to each frequency band of a plurality of beams;
a set of polarizations associated with each of the first reference sensing signal and the second reference sensing signal; and
a reporting configuration associated with the sensing measurement report.

28. The network entity of claim 26, further including configuration of the at least one processor to:
receive a capabilities indicator from the one or more network nodes, the capabilities indicator identifying a set of polarizations supported by the one or more network nodes.

29. The network entity of claim 28, wherein the capabilities indicator further includes one or more of:
a set of candidate transmission polarizations and a set of candidate reception polarizations;
a set of candidate band-specific polarizations associated with each frequency band of a plurality of frequency bands; and
a set of candidate beam polarizations associated with each beam of a plurality of beams.

30. The network entity of claim 28, further including configuration of the at least one processor to:
transmit a capabilities request message to the one or more network nodes, wherein the configuration of the at least one processor to transmit the capabilities request occurs prior to execution of the configuration of the at least one processor to receive the capabilities indicator.

* * * * *